Oct. 26, 1926.
O. GRAETZER
1,604,408
HOT WATER DISPENSING DEVICE
Filed May 19, 1925
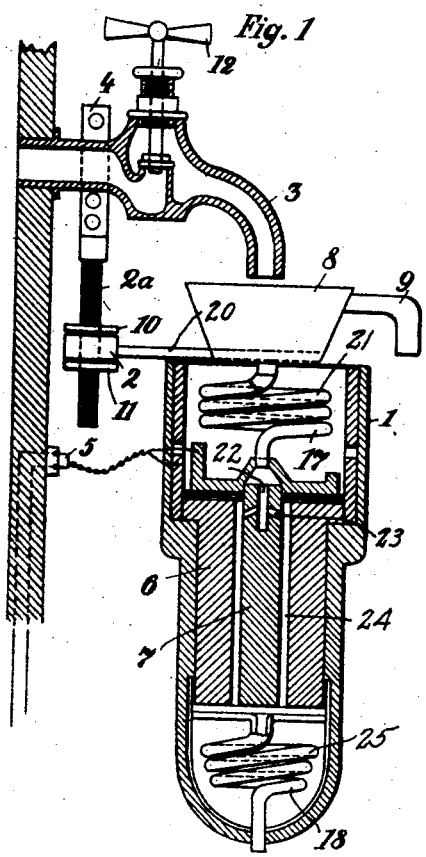
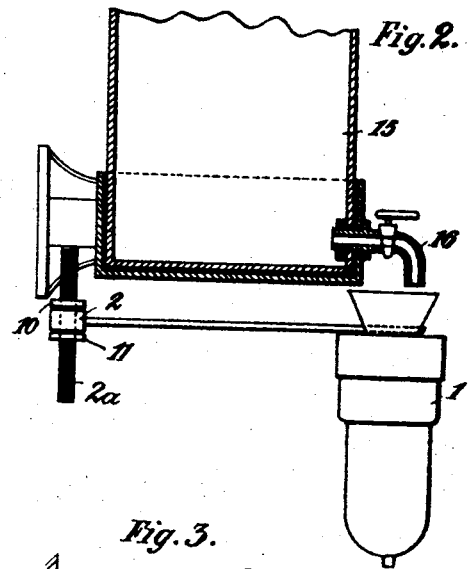
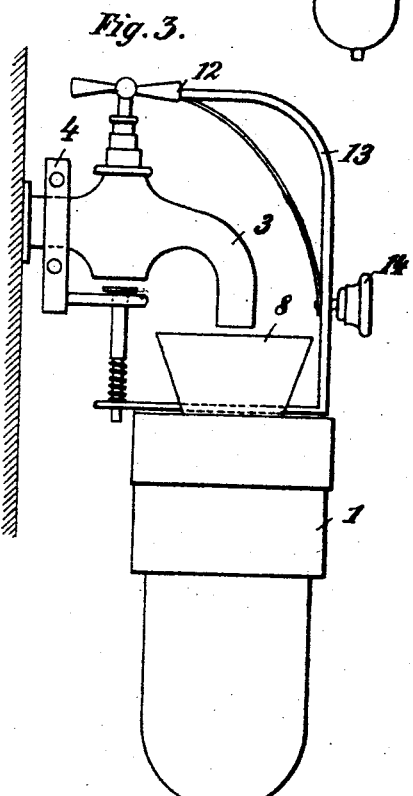
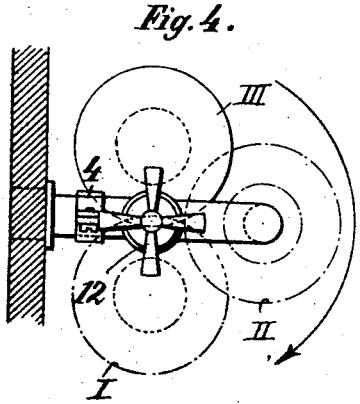
Inventor:
Otto Graetzer Patented Oct. 26, 1926.

1,604,408

UNITED STATES PATENT OFFICE.

OTTO GRAETZER, OF ZURICH-ZOLLIKON, SWITZERLAND.

HOT-WATER-DISPENSING DEVICE.

Application filed May 19, 1925, Serial No. 31,432, and in Switzerland June 5, 1924.

My invention refers to electric heaters, more especially in connection with the tap cock of a water piping. It is an object of my invention to provide a water heater which will allow tapping hot or cold water as desired without requiring any switching on or off of the electric current.

In liquid heaters as hitherto designed in which the water while passing through the heater is heated by the electric current, means have been provided for displacing the heater with respect to the tap cock so that the pressure acting on the water in the pipe line does no more act on the heater and at the same time hot or cold water can be tapped at will. These heaters are provided with resistance wires and require a switch for the cutting in and out of the electric current. In case that the current is switched on before the water is turned on and passes through the heater or if the circuit is closed by error after cutting off the water supply the resistance wires will burn through thus rendering the device inoperative. This drawback is the more important as devices of this kind are handled mostly by women devoid of all technical knowledge.

These prior devices involve the further drawback that the resistance wires are first required to heat the metal sleeve surrounding them, which in its turn will then heat the water. This arrangement involves comparatively heavy losses of current. Moreover the danger of the resistance wires being destroyed is the greater inasmuch as after a short while the sleeve will be covered with a coating of lime and other calcium salts which prevent convection of heat from the sleeve to the water. All these drawbacks are avoided in the heater according to the present invention in which the resistance wires are replaced by carbon electrodes, the heater being moreover mounted below the tap cock in such manner as to be easily turned aside in a well known manner.

In the drawings affixed to this specification and forming part thereof several water heaters embodying my invention are illustrated diagrammatically by way of example. In the drawings—

Fig. 1 is a vertical section of a heater mounted below the tap cock of a water piping.

Fig. 2 is a similar view of the heater mounted in position below the tap cock of a water reservoir.

Fig. 3 is a side elevation of the heater and tap cock in which the heater is operatively connected with the screw down valve of the cock in such manner that on the heater being turned to the right or left the valve will be either closed or opened.

Fig. 4 is a diagrammatic plan view showing the different positions of the heater.

Referring first to Fig. 1 of the drawings, 1 is the electric heater, the details of construction of which do not form part of this invention and need not be described in particular. The heater is suspended from an arm 20 having mounted on its end a nut 2 capable of vertical displacement on the threaded bolt 2$^a$ carried by a bracket 4 which is mounted to the rear of the tap cock 3. Counter nuts 10 and 11 serve for limiting the turning movement of the heater.

Water escaping from the tap cock 3 will freely pass through a funnel 8 into the coiled pipe 21 and from there into a boring 22 of the inner carbon electrode 7. Branches 23 lead from this boring to the annular space 24 between the electrode 7 and the outer cylindrical carbon electrode 6. The water after having passed through the space 24 leaves the heater through the coiled bottom pipe 25.

Obviously by providing the open funnel below the tap cock instead of tightly connecting the heater with the cock, the water enters the heater without any excess pressure. The carbon electrodes 6 and 7 being connected to a wall plug 5, the water passing through between them will bridge the gap between them and in doing so will be heated. Obviously if no water passes through between the electrodes the passage of current is interrupted and therefore this heater does not require being switched out or on, the turning on or off of the water sufficing to cut the current in or out.

While in the position shown in Fig. 1 the opening of the cock 3 will cause hot water to escape from the bottom pipe 25 of the heater which here assumes the position II in Fig. 4, cold water can be tapped by turning the heater aside, for instance into the position I in Fig. 1, the water from the cock 3 being now free to escape direct.

In the case where no water piping is available the heater can also be used in connection with a water reservoir, such as shown at 15 in Fig. 2, the heater being arranged for horizontal movement below the tap cock 16.

In the modification illustrated in Fig. 3 the heater has mounted thereon a curved arm 13 provided with a handle 14. The end of this arm is operatively connected with the handle 12 of the screw down valve of tap cock 3 in such manner that on the heater 1 being turned to the left or to the right, the arm 13 will move the handle 12 of the cock so as to either close or open the valve.

With the heater in the position I in Fig. 4 no water can escape. With the heater turned into the position II, the valve will be opened partly and will allow water to flow through the heater at comparatively low speed, the water being heated therein.

By turning the heater into the position III in Fig. 4 the valve will be opened further and a vigorous flow of cold water will be established from the cock.

Preferably the supporting means for the heater including arm 20, nut 2 and arm 13 are made of insulating material.

If the lower coiled pipe 25 has a smaller diameter than the upper coiled pipe 21 the water will be dammed up between the electrodes 6 and 7 and in consequence thereof the gap between the electrodes can be made considerably wider. In consequence thereof the water can then be heated to boiling temperature without any danger of short-circuiting. In this case moreover, the surfaces of the concentric electrodes need not be smoothed and no correct centering of the electrodes is required whereby the first costs are considerably diminished.

In all the modifications of the heater shown in the drawings the circuit is closed by the water flowing through the gap between the electrodes and in consequence thereof whenever the water is turned off no overheating of the heater can occur, inasmuch as then the gap between the electrodes is no more bridged, the circuit being thus interrupted automatically. All switches or the like can therefore be dispensed with.

I wish it to be understood that I do not desire to be limited to the exact details of construction shown and described, for obvious modifications will occur to a person skilled in the art.

I claim:—

1. Hot water dispensing device comprising a tap cock and an electric heating device below said cock adapted to be rendered operative by the water from said cock, said heating device being movable out of reach of the water escaping from said cock.

2. Hot water dispensing device comprising a tap cock and an electric heating device below said cock comprising a pair of electrodes separated by a gap and adapted to be rendered operative by the water from said cock, said heating device being movable out of reach of the water escaping from said cock.

3. Hot water dispensing device comprising a tap cock and an electric heating device below said cock adapted to be rendered operative by the water from said cock, said heating device being movable out of reach of the water escaping from said cock and a connection between said heating device and said cock whereby this latter is opened when said device is moved in one, and closed whenever it is moved in the opposite direction.

4. Hot water dispensing device comprising a tap cock, an electric heating device below said cock comprising a pair of electrodes separated by a gap and adapted to be rendered operative by the water from said cock, said heating device being movable out of reach of the water escaping from said cock and a drain pipe forming part of said heating device, the diameter of said drain pipe being such that the water flowing from said tap cock into said heating device is dammed up between said electrodes.

5. Electric heater comprising a pair of electrodes separated by a gap, means for supplying said electrodes with electric current, a coiled pipe on the entrance side of said gap and another coiled pipe on the exit side of the gap, the diameter of said latter pipe being smaller than that of the first pipe.

6. Electric heating system comprising a tap cock, a valve forming part of said cock, an electric heater mounted below said cock for horizontal displacement around the axis of said valve and an operative connection between said heater and said valve whereby said valve is opened and closed, respectively, when said heater is turned to one and the other side, respectively.

In testimony whereof I affix my signature.

OTTO GRAETZER.